(12) United States Patent
Huang

(10) Patent No.: US 8,251,419 B2
(45) Date of Patent: Aug. 28, 2012

(54) LENS RUNNER SYSTEM GRASPING DEVICE

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 106 days.

(21) Appl. No.: 12/882,218

(22) Filed: Sep. 15, 2010

(65) Prior Publication Data

US 2011/0291434 A1 Dec. 1, 2011

(30) Foreign Application Priority Data

Jun. 1, 2010 (TW) .............................. 99117522 A

(51) Int. Cl.
*B25B 9/00* (2006.01)
*B66C 1/00* (2006.01)

(52) U.S. Cl. ...................................... 294/100; 294/202

(58) Field of Classification Search .................. 294/100, 294/102.1, 196, 202, 203
See application file for complete search history.

(56) References Cited

U.S. PATENT DOCUMENTS

| | | | | |
|---|---|---|---|---|
| 3,108,835 A | * | 10/1963 | Rowekamp | 294/203 |
| 3,850,286 A | * | 11/1974 | Tobin, Jr. | 198/443 |
| 5,120,099 A | * | 6/1992 | Fletcher | 294/66.1 |
| 5,570,919 A | * | 11/1996 | Eusebe | 294/111 |
| 7,281,740 B1 | * | 10/2007 | Fields | 294/100 |
| 2008/0315605 A1 | * | 12/2008 | Shih | 294/100 |

* cited by examiner

*Primary Examiner* — Dean Kramer
*Assistant Examiner* — Stephen Vu
(74) *Attorney, Agent, or Firm* — Altis Law Group, Inc.

(57) ABSTRACT

A grasping device for grasping a lens runner system is disclosed. The grasping device includes a support having a connecting rod, four claws arranged around the connecting rod, a driving sleeve, and an actuator. Each claw includes a first end and a second end opposite to the first end and tapers from the second end to the first end. The first end is elastically connected to the connection rod. Each two adjacent claws define a gap for receiving the lens runner system. The driving sleeve sleeves into the claws from the first end. The actuator is supported by the support and configured for driving the driving sleeve to move relative to the second end.

17 Claims, 4 Drawing Sheets

LENS RUNNER SYSTEM GRASPING DEVICE

BACKGROUND

1. Technical Field

The present disclosure relates to grasping devices and, particularly, to a grasping device for grasping a lens runner system formed by a multi-cavity lens molding process.

2. Description of Related Art

Plastic lenses can be formed by a multi-cavity molding process, in which a runner system may typically include a sprue, four runners radially and perpendicularly extending outward from a distal end of the sprue, four lenses, and four gates connecting the respective lenses to a distal end of the runners. The runner system is stripped away from a multi-cavity mold by a conventional grasping device, such as a tweezers, for further processing to separate the four lenses from the gates. However, while picking up the runner system, the gates, the runners or lenses may deform or even break since the runner system may still stick to the multi-cavity mold, adversely affecting the post processes of separating the lenses from the runner system.

Therefore, it is desirable to provide a grasping device which can overcome the above-mentioned limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
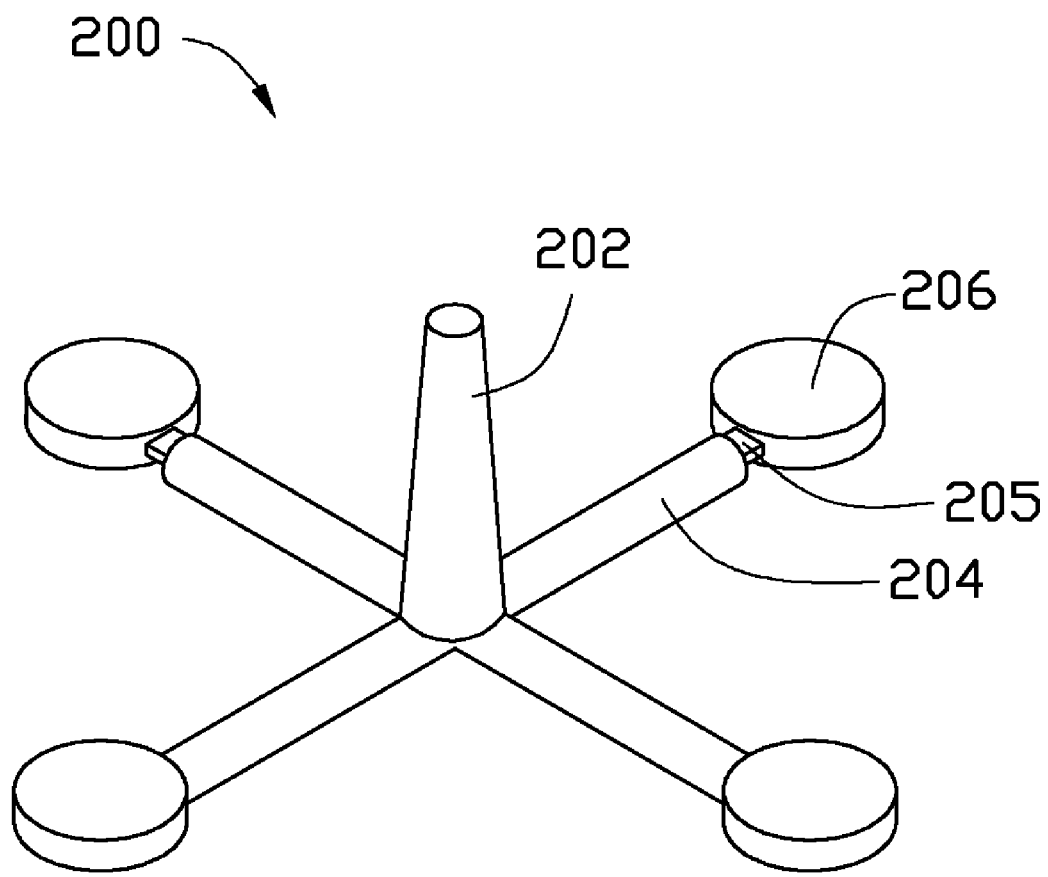
FIG. 1 is an isometric, schematic view of a runner system, according to an embodiment.
Figure 2:
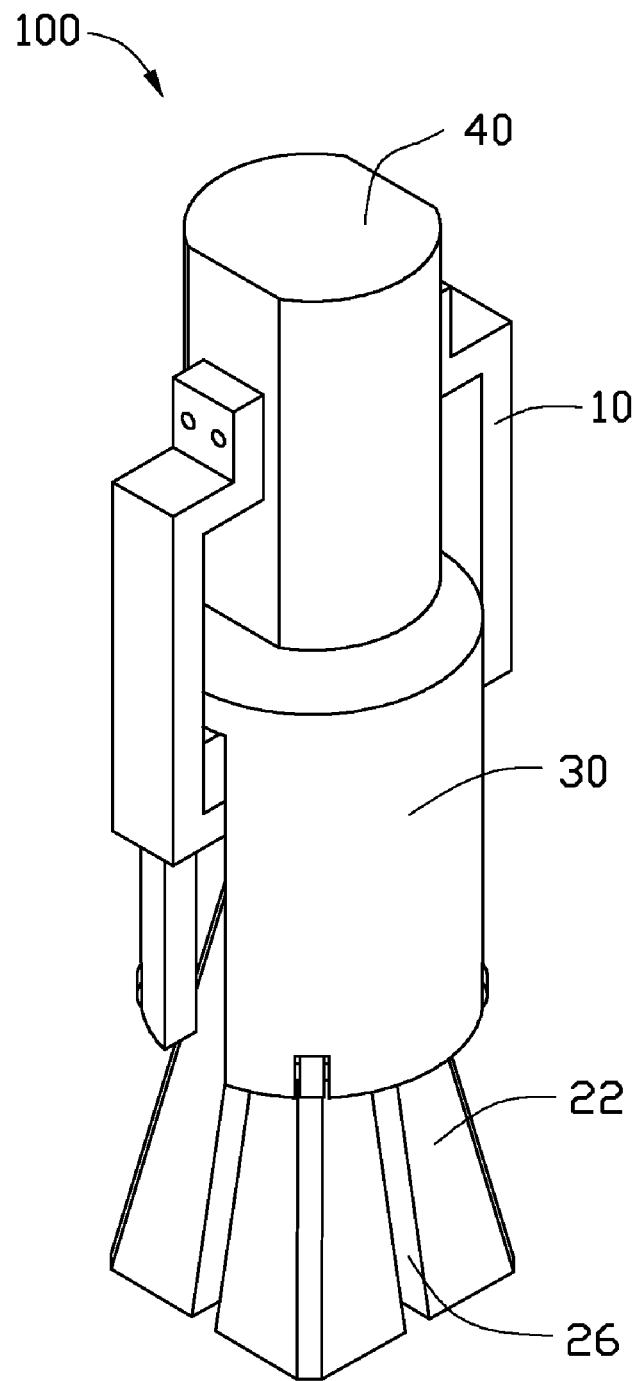
FIG. 2 is an isometric, assembled, schematic view of a grasping device, according to the embodiment.

Referring to FIGS. 1-2, a grasping device 100, according to an embodiment, is configured for grasping a runner system 200 and thus stripping the runner system 200 away from a multi-cavity mold (not shown). The runner system 200 includes a sprue 202, four runners 204 radially extending outward from a distal end of the sprue 202, four gates 205 and four lenses 206 formed at an end of the respective gates 205 of the runners 204 distant from the sprue 202.

Figure 3:
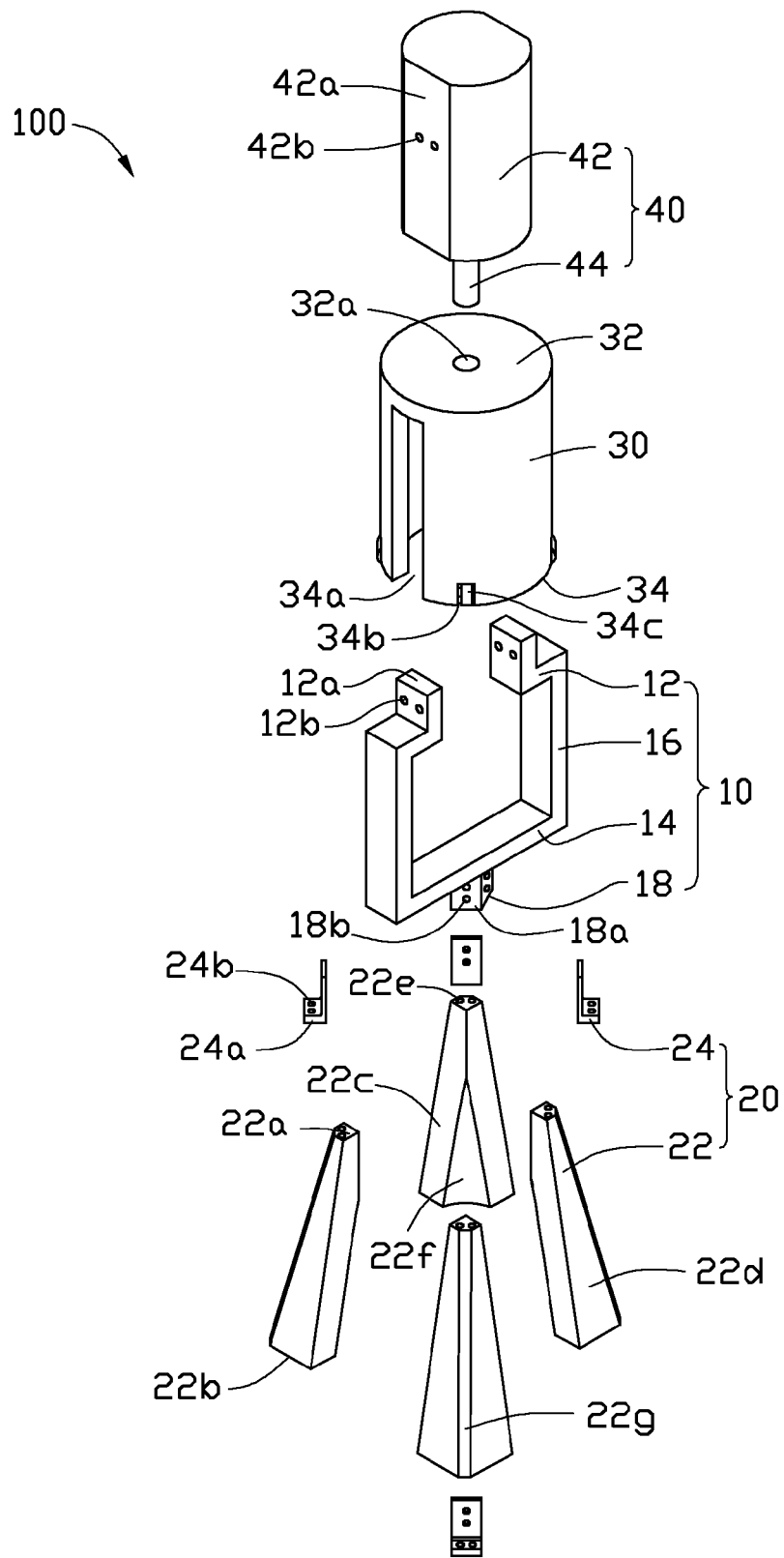
FIG. 3 is an isometric, exploded, schematic view of the grasping device of FIG. 2.

Referring to FIGS. 2 and 3, the grasping device 100 includes a support 10, four claws 20, a driving sleeve 30, and an actuator 40.

The support 10 is substantially a rectangular hollow frame and includes an upper board 12, a bottom board 14 parallel to the upper board 12, two parallel side boards 16 connecting the upper board 12 and the bottom board 14, and a connection rod 18 extending from a bottom side of the bottom board 14. The upper board 12 is separated at the center thereof, and two portions thereof adjacent to the separation point (i.e., the center) are bent away from the bottom board 14, thus forming two fixing sections 12a. Each fixing section 12a defines two first through holes 12b. The connection rod 18 is a rectangular rod and has four side surfaces 18a. Each side surface 18a defines two first threaded blind holes 18b.

Each claw 20 includes a claw body 22 and an elastic element 24.

The claw body 22 has a first end 22a and a second end 22b and tapers in from the second end 22b to the first end 22a. In particular, the claw body 22 is substantially a rectangular tapered rod and includes two upright sidewalls 22c and two sloping sidewalls 22d. The two upright sidewalls 22c extend uprightly between the first end 22a and the second end 22b and connect with each other. The two sloping sidewalls 22d extend slantingly between the first end 22a and the second end 22b and connect to the respective upright sidewalls 22c. The first end 22a defines two second threaded blind holes 22e. The claw body 22 defines a tapered bevel 22f in an intersection of the two upright sidewalls 22c adjacent to the second end 22b, which extends along a direction substantially parallel to an intersection line of the two sloping sidewalls 22d. The claw body 22 also defines a chamfer in an intersection of the two sloping sidewalls 22d, which also extends along the direction substantially parallel to the intersection line of the two sloping sidewalls 22d, thereby forming a sliding surface 22g.

The elastic element 24 is made of high-elasticity material such as spring steel and includes two elastic sections 24a that perpendicularly connect with each other.

Each elastic section 24a defines two second through holes 24b corresponding to the first threaded blind holes 18b and the second threaded blind hole 22e.

The driving sleeve 30 is substantially a cylindrical tube and has a closed end 32 and an opened end 34. The closed end 32 defines a connecting through hole 32a, substantially at the center thereof. The driving sleeve 30 diametrically defines two guiding slots 34a extending to the opened end 34 along the longitudinal direction thereof. The driving sleeve 30 also defines four notches 34b adjacent to the opened end 34. The four notches 34b correspond to the four sliding surfaces 22g. Each notch 34b is installed with a roller 34c.

The actuator 40 is a cylinder and includes a cylinder body 42 and a piston rod 44. The cylinder body 42 includes two fixing surfaces 42a opposite to each other. The distance between the two fixing sections 12a is slightly greater than the distance between the two fixing surfaces 42a. Each fixing surface 42a defines two third threaded blind holes 42b corresponding to the first through holes 12b.

In assembly, the elastic elements 24 connect the respective side surfaces 18a and the respective first ends 22a such that the second through holes 24b align with the respective first threaded blind holes 18b and the second threaded blind holes 22e. Then, screws (not shown) are employed, inserted through the second through holes 24b, and screwed into the first threaded blind holes 18b and the second threaded blind holes 22e. Thus, the claw bodies 22 are arranged around the connection rod 18 and the first ends 22a are elastically connected to the connection rod 18 such that an upright sidewall 22d of each claw body 22 faces an upright sidewall of another adjacent claw body 22. Each two adjacent claw bodies 22 (i.e., each two adjacent upright sidewalls 22d) form a gap 26 for grasping a corresponding runner 204.

Then, the driving sleeve 30 caps the claw bodies 22. In detail, the driving sleeve 30 is located between the two side boards 16, the bottom board 14 inserts into the two guiding slots 34a, and the rollers 34c lie on the respective sliding surfaces 22g. Next, the actuator 40 is positioned between the two fixing sections 12a such that the first through holes 12b align with the respective third threaded blind holes 42b and the piston rod 44 connects to the driving sleeve 30 by inserting and engaging with the connecting through hole 32a. Screws (not shown) are employed, inserted through the first through holes 12b, and screwed into the third threaded blind holes 42b. Thus, the actuator 40 is supported by the support 10 and connected to the driving sleeve 30.

Figure 4:
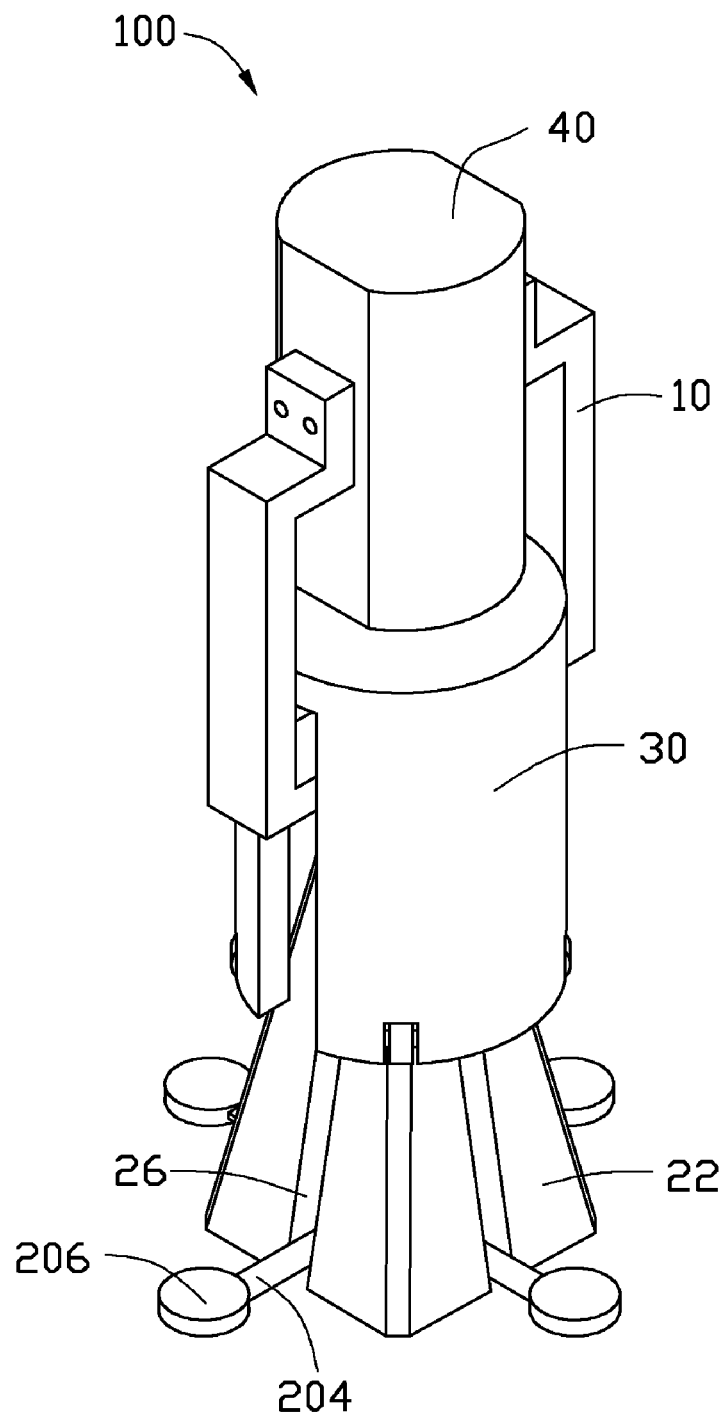
FIG. 4 is an isometric, schematic view showing that the grasping device of FIG. 2 holding the runner system of FIG. 1.

Referring to FIG. 4, in use, the grasping device 100 is moved into position over the sprue 202 of the runner system 200. The sprue 202 is accommodated in the spaced formed by the bevels 22f and the gaps 26 align with the respective runners 204. Then, the actuator 40 drives the driving sleeve 30 to move toward the second end 22b, since, a cross section of the claw bodies 22 gradually increases from the first end 22a to the second end 22b. Thus, during the driving sleeve 30 moving to the second end 22b, the driving sleeve 30 gathers the claw bodies 22 towards the center thereof. As a result, the gapes 26 gradually reduce in size until the runners 204 are firmly grasped by the claw bodies 22. Thus, the runner system 200 can be stripped from the mold by the grasping device 200.

Since all the runners 204, instead of only the sprue 202, are grasped, force is uniformly applied to the runner system 200. Thus, during the stripping process from a multi-cavity mold, the runner system 200 is well protected from uneven or lesser accurate grasps, reducing the eventuality of deformations.

The grasping device 100 can be used in other applications in other alternative embodiments. For example, the grasping device 100 can pick up other molded elements that have four runners. The grasping device 100 can be used to grasp molded elements that have other configurations, such as molded elements having two, three, five, or more runners. Of course, the number of the side surfaces 18a and the claws 20 would need to be changed correspondingly.

The support 10 is not limited to this embodiment, but can be redesigned to any configuration that can support the claws 20, the driving sleeve 30, and the actuator 40 as the desired manner described above. The claw bodies 22 and the elastic elements 24 can be any other configuration that are beneficial for grasping the runners 204 (for the claw bodies 22) and connect the claw bodies 22 to the support 10 (for the elastic elements 24). Also, in other embodiment, the claw bodies 22 and the elastic elements 24 can be integrally formed.

The number of the first through holes, 12b, the second through holes 24b, the first threaded blind holes 18b, the second threaded blind hole 22e, and the third threaded blind holes 42b can be changed depending on requirements, not be limited to this embodiment. In addition, in other alternative embodiments, other connection techniques can be employed to connect the claw bodies 22 to the support 10 and connect the actuator 40 to the support 10. For example, the claws 20 can be integrally formed with the support 10 and the cylinder body 42 can be adhered to the support 10.

The rollers 34c and the sliding surfaces 22g are employed to reduce friction when the driving sleeve moves. In other embodiment, if a power of the actuator 40 is large enough to overcome any friction, the sliding surfaces 22g, and/or the notches 34b, and the rollers 34c can be omitted.

The configuration of the bevels 22f is not limited to this embodiment but can be redesigned depending on requirement. If the runner system 200 has a relative thin sprue 202 which, without the bevels 22f, a space between the claw bodies 22 can accommodate, the bevels 22f can be resized or omitted.

The piston rod 44 also can connect to the driving sleeve by other technique, not be limited to the engagement of the piston rod 44 and the connecting through hole 32a.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A grasping device for grasping a lens runner system, the grasping device comprising:
a support extending a connection rod;
a plurality of claws arranged around the connection rod, each claw comprising a first end and a second end opposite to the first end and tapering from the second end to the first end, the first end being elastically connected to the connection rod, each two adjacent claws defining a gap for receiving the lens runner system;
a driving sleeve sleeving into the claws from the first end; and
an actuator supported by the support and configured for driving the driving sleeve to move relative to the second end.

2. The grasping device of claim 1, wherein each claw comprises a claw body and an elastic element, and the elastic element connects the claw body to the connection rod.

3. The grasping device of claim 2, wherein the elastic element is made of spring steel.

4. The grasping device of claim 2, wherein each claw body is substantially a rectangular tapered rod and comprises two upright sidewalls and two sloping sidewalls, the two upright sidewalls extend uprightly between the first end and the second end and connect with each other, the two sloping sidewalls extend slantingly between the first end and the second end and connect to the respective upright sidewalls.

5. The grasping device of claim 4, wherein the connection rod is a regular polygonal rod and comprises a plurality of side surfaces, each side surface defines a second threaded blind hole, each elastic element includes two elastic section perpendicularly connecting with each other, each elastic section defines a second through hole, each elastic element connects a respective side surface to a respective first end such that the second through hole is aligned with a respective second threaded blind hole, and screws insert through the respective second through hole and screw into the respective second threaded blind holes.

6. The grasping device of claim 4, wherein each claw body defines a tapered bevel in an intersection of the two upright sidewalls adjacent to the second end, and the bevel extends along a direction substantially parallel to an intersection line of the two sloping sidewalls.

7. The grasping device of claim 4, wherein each claw body defines a chamfer in an intersection of the two sloping sidewalls, the chamfer extends along the direction substantially parallel to the intersection line of the two sloping sidewalls and forms a sliding surface, the driving sleeve comprises a plurality rollers, each roller lies on a corresponding sliding surface.

8. The grasping device of claim 4, wherein the elastic element is made of spring steel.

9. The grasping device of claim 1, wherein the support comprises an upper board, a bottom board parallel to the upper board, and two parallel side boards connecting the upper board and the bottom board, and the connection rod extends from a side of the bottom board facing away from the upper board and positioned at the center of the side of the bottom board.

10. The grasping device of claim 9, wherein the driving sleeve comprises a closed end and an opened end, and diametrically defines two guiding slots extending to the opened end along the longitudinal direction thereof, and the bottom board is slidably received in the two guiding slots to guide the driving sleeve to move relative to the support.

11. The grasping device of claim 9, wherein the actuator is a cylinder that comprises a cylinder body and a piston rod.

12. The grasping device of claim 11, wherein the upper board is separated at the center thereof, two portions thereof adjacent to the separation point are bent away from the bottom board, thus forming two fixing sections, each fixing section defines a first through holes, the cylinder body having two opposite side surfaces, each of which defines a threaded blind hole, the actuator is located between the two fixing sections, the first through holes are aligned with the threaded blind holes, and screws inserts through the first through holes and screw into the threaded blind holes.

13. The grasping device of claim 12, wherein the driving sleeve comprises a closed end and an opened end, the closed end defines a connecting through hole, and the piston rod inserts and engages with the connecting through hole.

14. A grasping device, comprising:
a support having a connection rod;
a plurality of claws arranged around the connection rod, each claw comprising a first end and a second end opposite to the first end, the first end being elastically connected to the connection rod, each claw tapering from the second end to the first end thereof, each two adjacent claws defining a gap;
a driving sleeve partially receiving the claws and having an opening end, the opening end contacting the claws, the first end of each claw being received in the driving sleeve; and
an actuator connecting to the driving sleeve and configured to drive the driving sleeve to move relative to the second end such that the claws are compressed by the opening end to make the gaps decrease, or released from the opening end to make the gaps increase.

15. The grasping device of claim 14, wherein each claw comprises a claw body and an elastic element, and the elastic element connects the claw body to the connection rod, each claw body is substantially a rectangular tapered rod and comprises two upright sidewalls and two sloping sidewalls, the two upright sidewalls extend uprightly between the first end and the second end and connect with each other, the two sloping sidewalls extend slantingly between the first end and the second end and connect to the respective upright sidewalls.

16. The grasping device of claim 15, wherein the elastic element is made of spring steel.

17. The grasping device of claim 15, wherein the support comprises an upper board, a bottom board parallel to the upper board, and two parallel side boards connecting the upper board and the bottom board, and the connection rod extends from a side of the bottom board facing away from the upper board and positioned at the center of the side of the bottom board.

* * * * *